United States Patent [19]

Erlandson et al.

[11] 3,868,206

[45] Feb. 25, 1975

[54] APPARATUS FOR MANUFACTURE OF HIGHLY ORIENTED POLYMERIC CONTAINERS

[75] Inventors: Paul M. Erlandson; Edmund H. Merz, both of Palos Park, Ill.

[73] Assignee: Continental Can Company, Inc., New York, N.Y.

[22] Filed: July 19, 1973

[21] Appl. No.: 380,788

Related U.S. Application Data

[62] Division of Ser. No. 199,788, Nov. 17, 1971, abandoned.

[52] U.S. Cl. ............... 425/387 B, 264/94, 264/309, 264/314
[51] Int. Cl. .......................................... B29d 23/03
[58] Field of Search ............ 425/324 B, 387 B, 389, 425/390; 264/94, 97, 309, 314

[56] References Cited
UNITED STATES PATENTS

| | | | |
|---|---|---|---|
| 3,032,823 | 5/1962 | Sherman | 264/314 X |
| 3,470,282 | 9/1969 | Scalora | 425/326 B |
| 3,607,998 | 9/1971 | Goodridge | 264/314 X |

*Primary Examiner*—Francis S. Husar
*Assistant Examiner*—R. J. Charvat
*Attorney, Agent, or Firm*—Paul Shapiro; Joseph E. Kerwin; William A. Dittmann

[57] ABSTRACT

A method and apparatus for making highly oriented polymeric containers in which the method involves the deposition of a thermoplastic material onto an elastomeric form, fusing the material into a homogeneous mass and effecting temperature control and subsequent expansion of the form through the use of relatively incompressible fluids. The apparatus for practicing the process includes a support carrying the elastomeric form, a heating element and a fluid system for controlling the temperature of the material deposited upon the form and the expansion thereof.

3 Claims, 2 Drawing Figures

3,868,206

PATENTED FEB 25 1975

3,868,206

APPARATUS FOR MANUFACTURE OF HIGHLY ORIENTED POLYMERIC CONTAINERS

This is a division of Ser. No. 199,788, now abandoned filed Nov. 17, 1971.

BACKGROUND OF THE INVENTION

This invention relates to a method and apparatus for manufacturing hollow articles or containers from a thermoplastic material so as to obtain orientation of the polymeric chains of the material. More particularly, the invention relates to such a method and apparatus which may be used to manufacture a container for pressurized liquids, the container having high strength characteristics and substantial resistance to creep or distortion under pressures.

THE PRIOR ART

It is well known that many polymers undergo the phenomenon known as orientation when stretched in the solid state at a temperature above their glass temperature ($T_G$) and that articles of thermoplastic materials having greater strength characteristics may be obtained through such orientation of the polymer chains. Additionally, it is known that greater orientation occurs if the material is stretched or expanded at a temperature just above its glass transition temperature ($T_G$) and that the degree of orientation is also proportional to the rate of stretching. Finally, in order to insure that the alignment or deformation of polymeric chains remains in the oriented position, the material must be rapidly quenched or cooled below the glass transition temperature so as to insure that the orientation is frozen or locked into the formed structure.

SUMMARY OF THE INVENTION

Recognizing these conditions upon which maximum orientation of a thermoplastic container may be obtained, our invention involves the deposition of a thermoplastic material onto a form or sleeve by various methods, the fusing of such material into a homogeneous mass by raising its temperature to its melting point through the application of heat and the subsequent utilization of an incompressible fluid system to obtain cooling and expansion at a very high rate. Too, the fluid system may also be used to reduce the temperature of the formed article for "freezing in" the orientation of the polymer chains. Additionally, our invention encompasses an apparatus having an elastomeric bag or sleeve and an incompressible fluid system which may take several forms for permitting the accomplishment of the above process.

Accordingly, it is an object of our invention to provide an apparatus and a process whereby adequate containers can be manufactured for holding pressurized fluids such as carbonated beverages, and to provide such a container having a high strength to weight ratio thus reducing the quantity of the thermoplastic material required and making a less expensive article with superior characteristics.

Additionally, it is an object of our invention to provide a novel process and apparatus whereby containers may be manufactured at a very high production rate involving a minimum cycle time, with a simple and economical machine design. Too, the process and apparatus disclosed will obtain these results even though orientation is not accomplished or desired.

DESCRIPTION OF THE DRAWINGS

The manner in which these and other objects of the invention are obtained will be made clear by the following specification and claims when taken in conjunction with the drawings in which:

DETAILED DESCRIPTION

As previously suggested, our invention involves the formation of a fused thermoplastic material onto an expandable form, the subsequent transfer of heat to or from the material until it approaches its glass transition temperature, with subsequent expansion at a high rate to orient the polymeric chains so as to obtain creep resistance.

Figure 1:
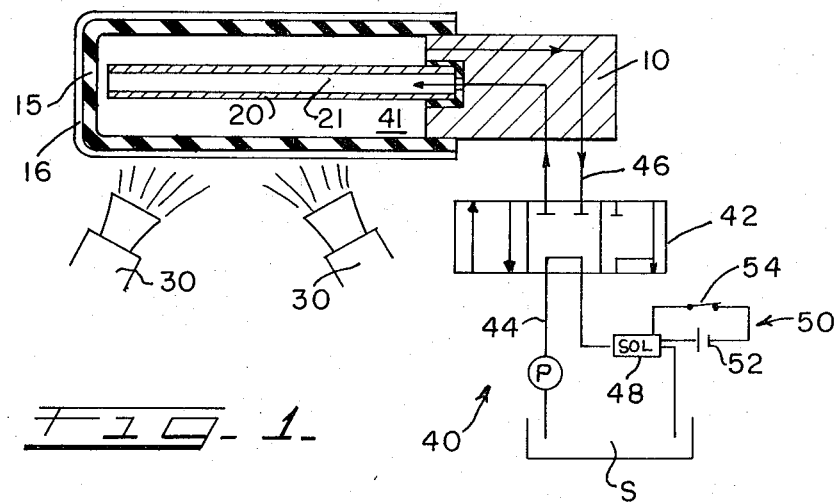
FIG. 1 is a schematic representation of the preferred embodiment of our invention and discloses the apparatus for the formation of the form as well as the incompressible fluid system utilized to obtain orientation of the article.

As shown in FIG. 1 of our preferred embodiment, the apparatus for practicing this process of our invention may comprise a support 10 which may be in the form of an annular member adapted to support an elastomeric sleeve 15 upon which a parison 16 of thermoplastic material is formed. The form 15 is preferably a relatively thin highly elastic membrane having high thermal conductivity which may be obtained by loading of the elastomeric material with thermal conducting substances such as metallic powders, graphite, etc. Such structure is designed to permit substantial heat transfer to and from the parison as well as rapid volumetric expansion thereof. Also carried by the support 10, and electrically insulated therefrom, is preferably a resistance heater 20 which provides heat through the form 15 so as to melt and fuse a thermoplastic material deposited thereon. An electrical circuit (not shown) is connected with the resistance heater in any conventional manner to provide the requisite energy.

Upon the sleeve or elastomeric bag 15 is deposited a thermoplastic material preferably in the form of a powder. Such deposition may take place through the utilization of spray nozzles as indicated at 30, through electrostatic deposition, or through dipping into a vat, etc. As a parison 16 is formed upon the sleeve 15, heat may be transferred through a fluid medium 41 and the sleeve 15 from the heater 20 so as to fuse the thermoplastic material into a homogeneous mass by heating same above its melt temperature.

As previously indicated, this homogeneous mass of polymeric material may then be cooled from its melt temperature to just above its glass transition temperature ($T_G$) to obtain maximum orientation and such may be effected through the use of fluid system 40. Obviously, if such orientation is not desired, expansion may occur at the fusing temperature. This system may be of the open center type and includes a sump S from which a fluid, (preferably incompressible and at a temperature near the glass transition temperature of the material) is drawn through intake conduit 44 by a pump P preferably of the internal gear type having a fixed displacement. Such fluid is directed to a directional flow valve 42 of the three position four way type and in its neutral position (as shown) returns the fluid to the sump through the open center passage thereof. For heat transfer to or from the parison, the valve may be shifted to the right with the fluid from the pump P being directed into the support 10 through appropriate passages therein, through a bore 21 of the heating element 20 and into the elastomeric bag or sleeve 15. Such fluid may be returned to the sump through a return conduit 46, the direction control valve 42 and then through a normally open solenoid valve 48. The solenoid valve, which normally remains open whereby fluid may be directly returned to the sump, is actuated by an electrical circuit 50 comprising a source of electrical energy 52 and a switch 54.

While thermoplastic material is being deposited upon form 15, it is intended that the control valve 42 be in its right position whereby fluid delivered by the pump P is directed through the valve 42, the bag 15 and returned to the sump. At this time, the electrical heater element 20 is actuated so as to provide heat which is transferred through the fluid medium 41 and the form 15 to fuse the material into a homogeneous mass, the flow of fluid through the form aiding the heat transfer. Alternatively, the valve 42 could be in neutral position with heat transfer being effected by convection through the fixed quantity of fluid within the form 15. As soon as the sinter molding process is completed, the heater may be turned off whereby continued fluid flow through the elastomeric sleeve 15 absorbs heat from the sintered form 16 and returns same to the sump S. As the parison of sintered material 16 approaches its glass transition temperature, the switch 54 of the solenoid valve 48 may be closed. With the continued delivery of an incompressible fluid from the pump P, and a closing of its access to the sump by the solenoid valve 48, the sleeve 15 will be expanded thereby forming an oriented article. As the solenoid valve 48 is again opened, continued flow of fluid to the finished article will continue to remove heat thus locking in the orientation of the polymer chains. Finally, the valve 42 may be shifted to the left whereby sufficient fluid is withdrawn from the form 15 so as to return it to its normal condition, and permit removal of the article. Additionally, a suction pump could be placed in the return circuit 46 to aid in withdrawing fluid from the sleeve.

It is contemplated that the pump P will have a very high delivery rate such that upon closing of the solenoid 48, the rate of stress of the sleeve 15 and the parison 16 is quite rapid. Obviously, other methods of obtaining such pulse type expansion of an elastomeric sleeve 15 and its form 14 are well known and may comprise electrohydraulic systems such as that depicted in U.S. Pat. Nos. 3,394,569 and 3,338,080 or a simple hydraulic ram placed in the return circuit.

Figure 2:
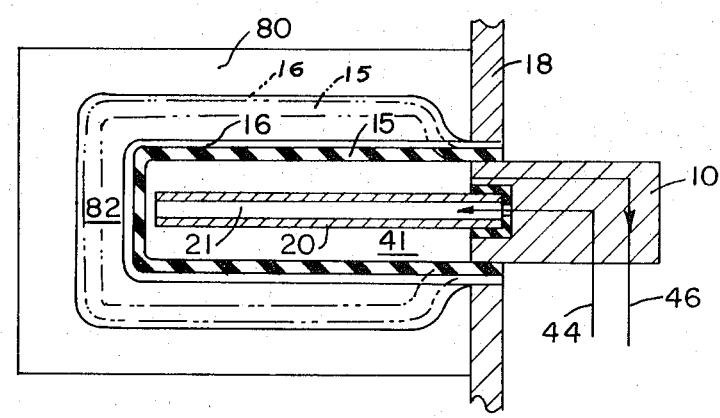
FIG. 2 discloses in schematic form the utilization of an expansion mold into which the form may be placed for expansion thereof.

When such high stress rates are utilized, it is anticipated that there will be no necessity to clamp the parison onto its support 10. However, when the mass of the parison is small and the stress rate is reduced, clamps 18 (see FIG. 2) may be necessary. Finally, it should be quite obvious that with respect to the sleeve 15, it may be formed in such manner such that upon expansion, the finished article will take the desired shape. Alternatively, and as depicted in FIG. 2, the parison 16 and elastomeric bag 15 carrying same may be placed into an expansion mold 80 having a cavity 82 for defining a container. This mold may take the shape of conventional molds and include upper and lower mold halves actuated by an hydraulic system. When such molds are utilized, the shape of the desired article may, of course, be controlled to a greater extent.

MODE OF OPERATION

As indicated, it is anticipated that a powder will first be deposited upon the elastomeric bag 15 by spray nozzles 30, with the electrical resistance heater 20 being actuated so as to sinter such powder through the transfer of heat through a fluid medium 41 and into the powder. With the directional control valve 42 being shifted to the right, fluid flow through the sleeve 15 aids in transferring heat to the parison, but effects removal of heat after the heater is turned off. Preferably, as the glass transition temperature of the material is approached, the support 10 and the form 16 is placed into an expansion mold 80, and the normally open solenoid valve is actuated so as to preclude the return of fluid to the sump via the conduit 46 thus resulting in an expansion of the elastomeric bag 15 and the sintered form against the interior walls of the mold 80, as shown in the dotted line position of FIG. 2. After valve 48 is opened, the cooling fluid from the sump S continues to pass through the formed article so as to cool same and thus to freeze in the orientation of the polymer chains. Finally, as the article is cooled below the glass transition temperature, the directional control valve 42 is shifted to its leftwardmost position whereby fluid produced by the pump is returned directly to the sump, and the fluid within the bag 15 is forced by the resiliency of this bag to the sump. Subsequently, the mold may be opened with support 10 and the sleeve 15 being withdrawn from the finished article.

Accordingly, it should be quite evident that a method and apparatus is proposed whereby the formation of the form or parison about an elastomeric sleeve or a core can be obtained with utmost convenience at a minimum of cost. Too, apparatus is additionally provided for accurately controlling temperature of the form such that at the proper moment, it can be expanded and at a very high rate, with subsequent cooling so as to freeze in the orientation. As pointed out in the above specification, numerous substitutes may exist for the various portions of the apparatus and certain steps of the process may be accomplished in various ways. Thus, the parison 16 may be formed by powder deposition, or by placing the elastomer form into an injection mold. Additionally, powder might be deposited from a fluidized bed either directly upon the rubber bag or upon a shaped support where it is partially or completely fused before transfer to the rubber bag. Finally, the rubber bag might be used as the male portion of a compression mold in which powder, granules, or a tube of the plastic is molded into the desired parison shape. Too, the sintering may result from the injection of plasticized material into an injection mold about the sleeve, by a conventional resistance or induction heater or through the use of a heated fluid.

We claim:

1. An apparatus having a plurality of of elements adapted to operate in sequence to produce a biaxial oriented container, said apparatus comprising:

a. a support;
   b. elastomeric means on said support for carrying a parison of a homogeneous mass of a thermoplastic material which undergoes orientation when stretched just above its glass transition temperature;

c. means adjacent the elastomeric means for depositing particles of the thermoplastic material upon the elastomeric means;

d. means carried within the elastomeric means for heating and fusing the thermoplastic particles into a homogeneous mass in the form of a parison;

e. an expansion mold for receiving the elastomeric means carrying the fused parison, and for shaping the parison upon expansion thereof and f. a liquid system connected to said elastomeric means for directing substantially incompressible liquids through said elastomeric means for cooling the fused parison to a temperature just above the glass transition temperature of the material and for subsequently expanding the cooled parison.

2. An apparatus as recited in claim 1 in which said elastomeric means comprises:

a. an elongated sleeve having a high elasticity and thermal conductivity.

3. An apparatus as recited in claim 1 in which said fluid system comprises:

a. a pump;

b. conduits for directing and returning fluid from said elastomeric means; and c. pulse means for causing an accumulation of liquid in said elastomeric means for expanding the parison.

* * * * *